June 24, 1958 F. PORTAIL 2,840,626
ALKALINE BATTERY CELLS
Filed Sept. 16, 1955

FERNAND PORTAIL
INVENTOR.

BY
ATTORNEY.

United States Patent Office 2,840,626
Patented June 24, 1958

2,840,626

ALKALINE BATTERY CELLS

Fernand Portail, Paris, France, assignor to Compagnie Industrielle des Piles Electriques Cipel, Neuilly-sur-Seine, France, a corporation of France Application September 16, 1955, Serial No. 534,686

Claims priority, application France September 18, 1954

2 Claims. (Cl. 136—102)

The present invention relates generally to alkaline battery cells of the type sometimes referred to as air-depolarizing cells, that is, cells including a depolarizing electrode usually made of porous carbon in contact with the atmosphere and a soluble zinc electrode.

The general object of the invention is to provide a cell of the described character which will possess an increased capacity for a given volume of electrolyte. Another object is to accomplish the above result without unduly complicating the structure of the cell components, and specifically without complicating the structure of the soluble zinc electrode. It is therefore a specific object to provide an improved cell of the type described which will have an increased capacity and yet be simple and economical to produce. A further object is to provide, in cells of the above kind, an optimum disposition of the cell components in relation to one another which will achieve the maximum capacity attainable for a given volume of electrolyte.

Various ways have been suggested in the past for increasing the electrical capacity of alkaline cells of the air-depolarizing type. Generally speaking such methods involve precipitating the zinc oxide developed during operation instead of allowing said zinc oxide to remain in the form of dissolved alkali zincate in the electrolyte as is the case in conventional alkali cells. For this purpose, it has been proposed to add into the electrolyte one or more substances such as lime, sodium chloride, and the like, acting to decompose the alkali zincate before the point has been reached where the alkali concentration has become inordinately low. It has also been suggested to use a soluble electrode made of several separate parts mounted in spaced regions of the body of electrolyte. Neither of these methods has proved entirely successful, since the first method has been found to be comparatively inefficient, while the second method above mentioned, though more efficient, involves a complicated construction for the negative electrode and thereby considerably increases the cost of the cell.

I have found that the desired result can be simply and efficiently attained by providing a certain specific relative disposition of the electrodes in relation to one another, and specifically by placing the soluble electrode, preferably made of zinc amalgam, in the bottom of the cell beneath the lower end of the depolarizing carbon electrode so that the latter is polarized preferentially at its lower portion as compared with its upper portion which projects upwardly from the free surface of the electrolyte and is exposed to the atmosphere. In order to ensure that the operation of the cell embodying this invention will progress smoothly until the cell has been completely filled with deposited zinc oxide, the depolarizing carbon electrode preferably has a coating or layer of an inert material, such as, glass fibre or the like, that is permeable to the electrolyte but impermeable to the zinc oxide suspended or deposited therein, and that extends around the side surface or surfaces of the carbon electrode along a major portion of the length of the latter beginning at the lower end of the carbon electrode so that the zinc oxide will be pevented from coming into contact with the carbon electrode to cause interruption of the action of the battery until the latter has been substantially filled with deposited zinc oxide. Further, the battery or cell embodying this invention also preferably has a coating of insulating material that is impervious to the electrolyte and that extends over the lower or base end surface of the depolarizing carbon electrode to render that end surface confronting the top surface of the zinc electrode inoperative, so that the travel of ions between the soluble zinc electrode and the carbon electrode is prolonged to accentuate the preferential polarization of the latter in accordance with the present invention.

The above, and other objects, features and advantages of the present invention will be apparent in the following detailed description of illustrative embodiments which is to be read in connection with the accompanying drawing forming a part hereof, and wherein.

Figure 1:
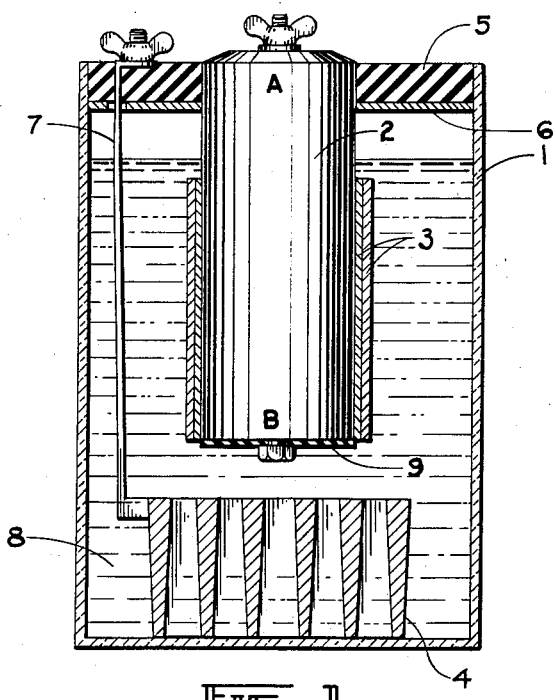
Fig. 1 is a vertical sectional view of an alkaline battery cell embodying the present invention.

The cell illustrated in Fig. 1 includes a tank or container 1 made of any suitable insulating material that is non-corrodable by the electrolyte, for example, molded plastic material or metal coated with a suitable insulating alkali-resistant varnish. Supported centrally in the cell from the top thereof is a depolarizing electrode 2 made of carbon material permeable to air while being substantially impermeable to the electrolyte.

The base or lower end surface of the carbon electrode 2 preferably has a coating 9 thereon of an insulating material which is immune to, and impermeable by, the electrolyte, for example, mineral pitch, varnish or the like, so that the electrolyte cannot come into contact with the base or lower end surface of the carbon electrode.

Further, surrounding the carbon electrode 2, along a major portion of the length of the latter, is a double layer or coating 3 made of an insulating material, such as, for example glass fibres and the like, with the coating 3 being permeable to the electrolyte but impermeable to the zinc oxide suspended or deposited in the electrolyte. Thus, the electrolyte can contact the carbon electrode 2 only at the lateral or side surface or surfaces of the latter, while the zinc oxide is excluded from contact with the carbon electrode along that portion of the length thereof immersed in the electrolyte and enveloped by the coating 3.

Figure 2:
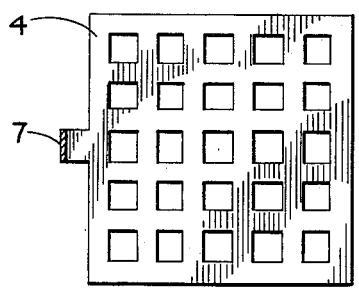
Fig. 2 is a plan view of an electrode included in the cell of Fig. 1.
Figure 3:
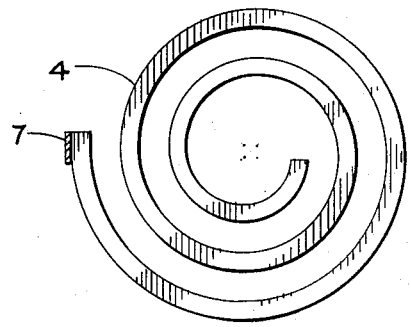
Fig. 3 is a plan view of an electrode that can be substituted for the one illustrated in Fig. 2.

Resting on the bottom of the tank 1 and spaced from the base or lower end surface of electrode 2 is a soluble electrode 4 made of zinc amalgam. As shown in Fig. 2, the zinc electrode may be formed generally as a grating having a flat top and spaced bars which taper downwardly in the manner previously known per se, but for the particular reasons to be later explained. Instead of the grid-shaped zinc electrode shown in Fig. 2, one in the form of a spiral, as in Fig. 3, or in various other shapes, might also be used.

The top of the tank 1 comprises a plate 6 of molded plastic supporting the carbon electrode therein, and sealed with a coat 5 of suitable material, such as, mineral wax. The soluble electrode 4 is connected with the negative terminal of the cell by a connector strip 7 which may be made of tin-coated copper having a coat of varnish thereon. The positive terminal is mounted on the central carbon electrode 2. The electrolyte 8 may comprise a solution of caustic potash in liquid form or mixed into a suitable solid paste. The electrolyte has a free surface so that the upper end portion of electrode 2 is exposed to the atmosphere.

In describing the operation of the cell disclosed herein, the reason for imparting a downwardly tapered form to the zinc electrode will first be indicated. Since the depolarizing electrode is made of impermeable porous carbon, and is active only at the side or lateral surface thereof, and since the active surface of the zinc is positioned at various distances from the active side surface of this carbon electrode, the current density will not be uniform throughout the substantial vertical height of the zinc electrode, but will be smaller for a surface element remote from the upper end of the carbon electrode in contact with the surrounding air than for a surface element nearer said top end of the carbon electrode. Hence, by imparting to the zinc electrode a greater thickness towards the top than at the bottom thereof, the area of zinc exposed to the electrolyte may be made to remain substantially constant during the discharge, even though the upper part of the electrode will dissolve at a higher rate than the bottom owing to the higher current density thereat.

In the operation of the cell described, the bottom portion B of the carbon electrode 2 will become polarized at a faster rate than the upper portion A because of the location of the negative electrode 4 below the lower end of the carbon electrode. Hence the porous material of the positive carbon electrode 2 becomes filled with hydrogen in its bottom portion B, whereas its top part A in contact with the atmosphere becomes filled with atmospheric gases. After the cell has been in operation for a certain period of time, a secondary cell element is set up through the carbon between the parts A and B of the positive electrode. As is known, the operation of this secondary cell has the effect of depolarizing the main cell operating between the active surfaces of electrodes 2 and 4 through the electrolyte. At the same time, zinc oxide hydrate is deposited in the bottom of the cell.

The precipitation of the zinc oxide hydrate may be explained as follows. Zinc oxide hydrate dissolves in an alkali AOH (wherein A represents a monovalent alkali metal radical) according to the equation:

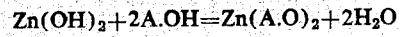

$$Zn(OH)_2 + 2A.OH = Zn(A.O)_2 + 2H_2O$$

and the heat of dissolution is not more than 8 calories. Hence the voltage required to electrolyse the solution will not be higher than $8:46.3 = 0.172$ volt. On the other hand the electromotive force developed by the gas cell is in the order of one volt. Therefore the current generated by the secondary cell flowing through an external circuit including the electrolyte will produce an electrolysis of the alkali zincate. As a result of the operation of the secondary cell, therefore, zinc oxide will be deposited in the bottom of the cell while the alkali hydroxide will be carried to the top portions of the electrolyte.

The process thus initiated will continue with zinc oxide being gradually deposited in successive layers until the cell has become completely filled with the oxide. The coating 3 will prevent contact of the deposited zinc oxide with the active side surface of the carbon electrode and avoids interruption of the operation of the cell until the level of the zinc oxide rises above the top end of the coating 3. In this way it will be understood that the cell will continue to operate for the full capacity permitted by the amount of electrolyte used.

The efficiency of the depolarizing action produced by the secondary cell is promoted by selecting the length of the positive carbon electrode sufficiently large with respect to its transverse dimensions. Specifically I have found that satisfactory results are obtained when the length of the carbon electrode is selected larger than its diameter in cases where a cylindrical carbon electrode is used, and larger than one quarter of the perimeter of the cross section of the electrode where a rectangular electrode is used. Best results have been obtained when the ratio of the length to the diameter, or to one quarter the perimeter, as the case may be, of the electrode is substantially equal to 2/1; however, the value of this optimum ratio has not been found to be too critical.

The insulating coating 9 at the bottom end surface of the anode or carbon electrode 2 renders inactive that end surface confronting the zinc electrode, and serves to prolong the distances travelled by the ions between the zinc and carbon electrodes for the purpose of accenting the depolarizing effect described above.

As stated, the negative zinc electrode may be provided with any suitable shape, such as, a grid, spiral, or the like. It is important however that the total surface area of this electrode be large enough with respect to the depolarizing capacity of the secondary cell, since the latter determines the magnitude of the current which may be demanded of the main cell. Thus, the zinc electrode may be provided in any suitable shape which will afford a sufficient total surface area of zinc for a given volume thereof.

Various modifications may, of course, be made in the details of the embodiments described and illustrated herein without exceeding the scope of the invention as defined in the appended claims.

What I claim is:

1. An air-depolarized electric cell comprising a container having a monovalent alkali metal hydroxide electrolyte therein, a positive depolarizing electrode of porous carbon having a vertical length which is substantially greater than the effective diameter of the cross-section thereof, said positive depolarizing electrode having an upper part in contact with the atmosphere and a lower part projecting into said electrolyte, a negative electrode of soluble zinc disposed in the bottom of said container and having its upper surface beneath said lower part of the positive depolarizing electrode with all parts of said negative soluble electrode being spaced downwardly from the level of the lowermost part of said positive depolarizing electrode, an insulating coating on the bottom end surface of said positive depolarizing electrode confronting said negative soluble electrode to prevent contact of said electrolyte with said bottom end surface and thereby prolong the paths of travel of ions between said negative soluble electrode and said positive depolarizing electrode, and a protective shield surrounding the side surface of said positive depolarizing electrode along a substantial portion of the length of the latter beginning at the bottom end of said positive depolarizing electrode, said shield being formed of an insulating material permeable by the electrolyte and impermeable to zinc oxide so that, when zinc oxide is deposited in the electrolyte by the action of the cell and settles on the bottom of said container, contact of the zinc oxide with the active side surface of the positive depolarizing electrode is prevented until the level of zinc oxide reaches above the top of said shield.

2. An air-depolarized electric cell of the described character; comprising a container having a body of monovalent alkali metal hydroxide electrolyte therein, a top cover on said container, a positive electrode of porous carbon supported by said cover and depending vertically from the latter into the electrolyte, said positive electrode having a vertical length substantially greater than the effective diameter of the cross-section thereof, the top of said positive electrode projecting through said cover and being exposed to the atmosphere, a zinc-base negative electrode disposed in the bottom of said container and being wholly located below the level of the bottom end of said positive electrode, said negative electrode having a generally flat top surface beneath and spaced from said bottom end and horizontally spaced portions of downwardly tapered thickness extending down from said flat top surface to the bottom of the container, a positive terminal connected to the top end of said positive electrode, a negative electrode, an insulated conductor connecting said negative terminal to said negative electrode so that, when current is drawn from said terminals, a secondary cell element is set up within said positive electrode between the top and bottom portions of the latter to effect depolarization of the main cell operating between the positive and negative electrodes while zinc oxide hydrate is produced and is decomposed by said secondary cell element into solid zinc oxide, setting on the bottom of the container, and alkali hydroxide returning to the electrolyte, a coating surrounding the side surface of said positive electrode along a substantial portion of the length of the latter beginning at the bottom end thereof, said coating being immune to, and permeable by, the electrolyte and being impermeable by said solid zinc oxide, and an insulating coating on the bottom end surface of said positive electrode confronting said negative electrode preventing contact of the electrolyte with said bottom end surface and thereby prolonging the paths of travel of the ions between said negative and positive electrodes.

References Cited in the file of this patent

UNITED STATES PATENTS

| | | |
|---|---|---|
| 585,855 | Sully | July 6, 1897 |
| 779,589 | Dewey | Jan. 10, 1905 |
| 1,370,119 | Jungner | Mar. 1, 1921 |
| 1,621,481 | Fery | Mar. 15, 1927 |
| 2,085,269 | Oppenheim | June 29, 1937 |
| 2,118,712 | Oppenheim | May 24, 1938 |
| 2,146,348 | Portail | Feb. 7, 1939 |
| 2,578,534 | Giles et al. | Dec. 11, 1951 |